United States Patent Office 3,243,440
Patented Mar. 29, 1966

3,243,440
PROCESS FOR PRODUCING PYRROLIDONE CARBOXYLIC ACID DERIVATIVES WHICH COMPRISE HEATING α - HYDROXY - GLUTARONITRILE WITH WATER
Gentaro Noyori and Hidemoto Kurokawa, Tokyo, Japan, assignors to The Noguchi Institute, Tokyo, Japan, a corporation of Japan
No Drawing. Filed Apr. 23, 1963, Ser. No. 274,935
Claims priority, application Japan, Apr. 27, 1962, 37/17,066
6 Claims. (Cl. 260—326.3)

The present invention relates to a process for producing DL-glutamic acid from α-hydroxyglutaronitrile. More particularly, it relates to an improvement in the production of DL-glutamic acid from α-hydroxyglutaronitrile, said improvement comprising heating α-hydroxyglutaronitrile in water at a certain temperature and then hydrolyzing the reaction product according to the conventional procedure.

An object of the present invention to provide an improved process for the production of DL-glutamic acid from α-hydroxyglutaronitrile by a simple procedure in excellent yield, with no use of ammonia. Other objects and advantages of the present invention would be apparent from the following description.

α-hydroxyglutaronitrile is cyanhydrin of β-formylpropionitrile, namely, can be easily produced by reaction of β-formylpropionitrile (which can be obtained by oxo reaction of acrylonitrile) with hydrocyanic acid or a cyanide salt, or can be produced by reaction of acrolein with hydrocyanic acid.

The conventionally known process for the production of DL-glutamic acid from α-hydroxyglutaronitrile is an application of the Tiemann's reaction for the synthesis of an aminonitrile from a cyanhydrin and ammonia, followed by a hydrolysis of the resulting α-aminoglutaronitrile to produce DL-glutamic acid. This process can be shown by the following formula.

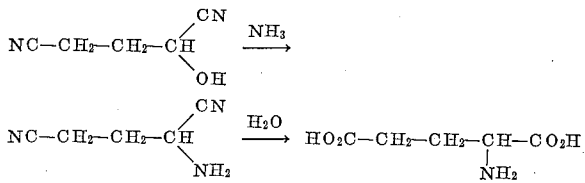

In the conventional production of DL-glutamic acid from acrylonitrile, on the other hand, occurrence of α-hydroxyglutaronitrile as an intermediate may be considered during the so-called Strecker's reaction of β-formylpropionitrile, which is produced by oxo reaction of acrylonitrile at the first step, with hydrocyanic acid and ammonia or with an alkali metal cyanide and ammonium chloride in an aqueous ammonia. However, this reaction is carried out in the presence of ammonia.

Now, the present inventors have discovered a novel process which is quite unlike the conventional processes as mentioned above and in which α-hydroxyglutaronitrile is heated simply in water without ammonia and the resulting product is then hydrolyzed to produce DL-glutamic acid.

When α-hydroxyglutaronitrile is heated in water, according to the present invention, the nitrile groups in α-hydroxyglutaronitrile are firstly hydrolyzed to be converted to acid amide groups and/or ammonium salt of carboxylic acid groups. Upon continuation of the heating, the hydrolyzed product is converted to a pyrrolidonecarboxylic acid derivative through dehydration reaction of the OH group at α-position and the acid amide group (—CONH$_2$) or the ammonium salt of carboxylic acid group (—CO$_2$NH$_4$) at γ-position formed from the γ-nitrile group. The pyrrolidonecarboxylic acid derivative thus formed can be hydrolyzed according to the conventional procedure to produce DL-glutamic acid. The reactions may be illustrated by the following formula.

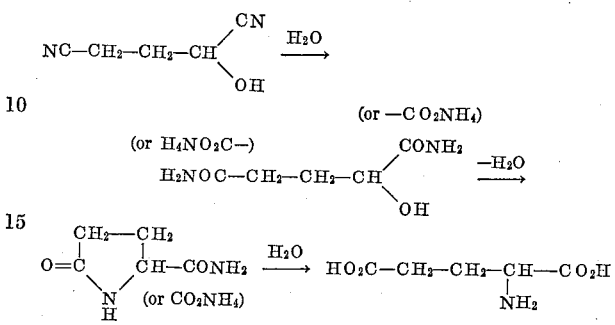

In the present invention, there is no need of using liquid ammonia or an aqueous ammonia, unlike the conventional processes. But, α-hydroxyglutaronitrile is merely heated in 1 to 20 parts of water per part of α-hydroxyglutaronitrile at a temperature of 150 to 300° C., and the resulting reaction product is hydrolyzed with an acid or an alkali according to the conventional procedure, thereby to produce DL-glutamic acid in about 80% yield from α-hydroxyglutaronitrile.

The reaction product obtained by heating α-hydroxyglutaronitrile in water is at least one of the pyrrolidonecarboxylic acid derivatives having the formula of

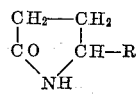

wherein R represents a radical selected from the group consisting of —CONH$_2$ and —CO$_2$NH$_4$.

If desired or required, α-hydroxyglutaronitrile may be heated in water in the presence of a catalyst which accelerates the hydrolysis or the dehydration, such as zinc chloride, an active alumina, and the like, to secure the completion of the reaction within a shorter period of time.

Since α-hydroxyglutaronitrile can be easily prepared from β-formylpropionitrile and hydrocyanic acid or an alkali metal cyanide, and β-formylpropionitrile can be formed by oxo reaction of acrylonitrile, the present invention make possible a novel process for the commercial production of DL-glutamic acid from acrylonitrile in high yield with no need of ammonia.

The process of the present invention will more concretely be illustrated with reference to the following examples, which are, however, provided merely in way of illustration and not in way of limitation.

*Example 1*

To 8.94 g. of ice-cooled β-formylpropionitrile (92.96% grade) were added 0.1 ml. of pyridine and 4.72 ml. of hydrocyanic acid, and the mixture was stirred for 2 hours at a temperature of 0° to 4° C., thereby to produce α-hydroxyglutaronitrile. The α-hydroxyglutaronitrile was mixed with 90 ml. of water, heated gradually in an autoclave having 300 ml. content, and kept at 260° C. for 2 hours. The reaction mixture was concentrated and dried up. The dried substance was heated with 100 ml. of concentrated hydrochloric acid at 110° C. for 2 hours for hydrolysis.

A part of the hydrolyzate was analyzed for DL-glutamic acid after removal of the ammonium salt. The result showed formation of 11.5 g. of DL-glutamic acid, which corresponds to 78.2% yield based upon β-formylpropionitrile.

The remainder of the hydrolyzate was decolorized with active carbon, concentrated and dried up. The dried substance was dissolved in 20 ml. of water, and added with a sodium hydroxide solution to adjust the pH to 3.2. The isolated crystals were separated by filtration and dried. The product, weighing 9.5 g. was certified to be DL-glutamic acid hydrate $$(HO_2C—CH_2—CH_2—CH(NH_2)—CH_2H \cdot H_2O)$$

by infrared absorption spectrum analysis and others.

Example 2

α-Hydroxyglutaronitrile produced from β-formylpropionitrile as in Example 1 was mixed with 90 ml. of water and 5 g. of active alumina, and the mixture was heated in an autoclave having 300 ml. content at 260° C. for 1 hour. The reaction mixture was filtered to remove the active alumina off, and the filtrate was treated as described in Example 1. An analysis showed formation of 11.8 g. of DL-glutamic acid.

What we claim is:

1. A process comprising heating α-hydroxyglutaronitrile in 1 to 20 parts of water per part of α-hydroxyglutaronitrile at a temperature of 150° to 300° C., thereby to produce at least one of the pyrrolidonecarboxylic acid derivatives having the formula of

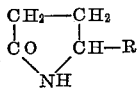

wherein R is selected from the group consisting of —CONH₂ and —CO₂NH₄.

2. A process comprising heating 1 part of α-hydroxyglutaronitrile with 1 to 20 parts of water in the presence of a catalyst selected from the group which consists of zinc chloride and active alumina at a temperature of 150° C. to 300° C., thereby to produce at least one of the pyrrolidone-carboxylic acid derivatives having the formula:

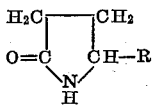

wherein R is selected from the group consisting of —CONH₂ and —CO₂NH₄.

3. A process comprising heating 1 part of α-hydroxyglutaronitrile with 1 to 20 parts of water in the presence of active alumina at a temperature of 150° to 300° C., thereby to produce at least one of the pyrrolidonecarboxylic acid derivatives having the formula:

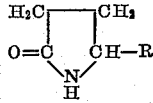

wherein R is selected from the group consisting of —CONH₂ and —CO₂NH₄.

4. In a process for producing DL-glutamic acid by preparing and then hydrolyzing at least one of the pyrrolidonecarboxylic acid derivatives having the formula:

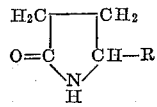

wherein R is selected from the group consisting of —CONH₂ and —CO₂NH₄, and the improvement which comprises heating 1 part of α-hydroxyglutaronitrile with 1 to 20 parts of water at a temperature of 150° C. to 300° C. to prepare said pyrrolidonecarboxylic acid derivative.

5. In a process for producing DL-glutamic acid by preparing and then hydrolyzing at least one of the pyrrolidonecarboxylic acid derivatives having the formula:

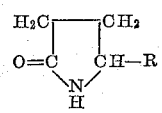

wherein R is selected from the group consisting of —CONH₂ and —CO₂NH₄, the improvement which comprises heating 1 part of α-hydroxyglutaronitrile with 1 to 20 parts of water in the presence of a catalyst selected from the group which consists of zinc chloride and activated alumina to prepare said pyrrolidonecarboxylic acid derivative.

6. In a process for producing DL-glutamic acid by preparing and then hydrolyzing at least one of the pyrrolidonecarboxylic acid derivatives having the formula:

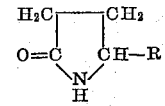

wherein R is selected from the group consisting of —CONH₂ and —CO₂NH₄, the improvement which comprises heating 1 part of α-hydroxyglutaronitrile with 1 to 20 parts of water at a temperature of 150° to 300° C. in the presence of activated alumina to prepare said pyrrolidonecarboxylic acid derivative.

References Cited by the Examiner

UNITED STATES PATENTS

| | | | |
|---|---|---|---|
| 2,833,786 | 5/1958 | Purvis | 260—326.3 |
| 2,837,532 | 6/1958 | Purvis | 260—326.3 |

NICHOLAS S. RIZZO, *Primary Examiner.*

JOSE TOVAR, *Assistant Examiner.*